United States Patent [19]

Maples

[11] Patent Number: 4,944,877
[45] Date of Patent: Jul. 31, 1990

[54] SPACERLESS FEED CHANNEL MEMBRANE FILTER ELEMENT

[76] Inventor: Paul D. Maples, 820 Los Vallecitos, San Marcos, Calif. 92069

[21] Appl. No.: 418,873

[22] Filed: Oct. 10, 1989

[51] Int. Cl.$^5$ ............................................. B01D 6/108
[52] U.S. Cl. ........................... 210/321.74; 210/321.76; 210/321.83; 210/321.85; 210/493.4; 210/497.1
[58] Field of Search ................ 210/257.2, 195.2, 321.6, 210/321.74, 321.76, 321.83, 321.85, 497.1, 321.64, 493.4; 204/301

[56] References Cited

U.S. PATENT DOCUMENTS 4,284,492 8/1981 Karn ..................................... 204/301
4,761,295 8/1988 Casey .................................. 210/257.2

Primary Examiner—Frank Sever
Attorney, Agent, or Firm—Henri J. A. Charmasson

[57] ABSTRACT

A reverse osmosis filtration device which comprises a flexible elongated membrane bladder spirally wrapped around a purified water duct in a series of spaced-apart coils supported about their edges by perforated spacers. The device is installed in a water supply conduit to extract a volume of purified water under typical household line pressure while allowing the brine-carrying feed water for other normal household usage such as clothes and dishwashing, toilet flushing, showering and bathing.

12 Claims, 1 Drawing Sheet

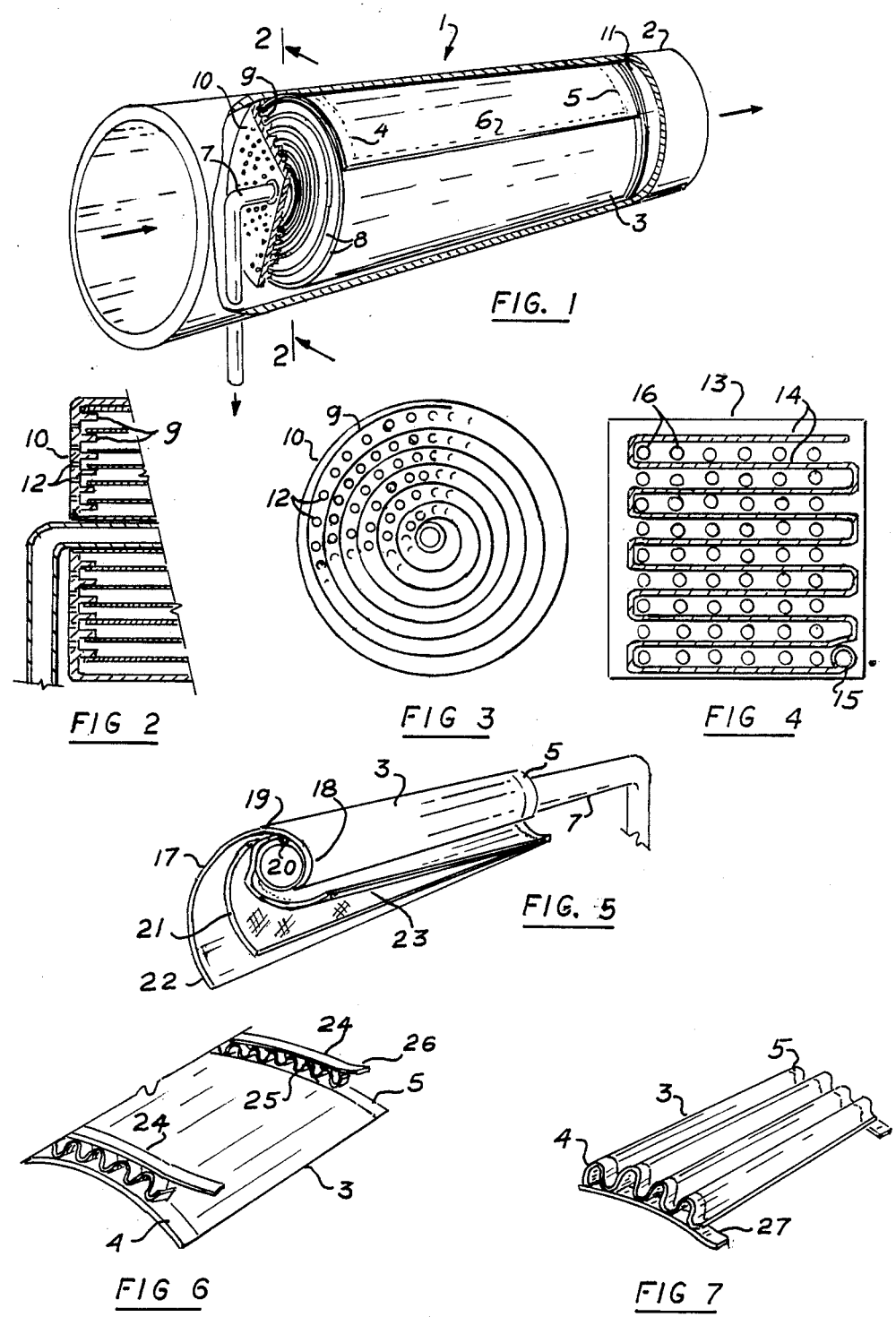

SPACERLESS FEED CHANNEL MEMBRANE FILTER ELEMENT

BACKGROUND OF THE INVENTION

This invention relates to reverse osmosis membrane filter elements and cation devices. The basic element in a reverse osmosis filtration system is the polymeric membrane that under specific differential osmotic pressure condition allows the free passage of water while impeding the passage of salt and other impurities.

In the spiral membrane filter elements of the prior art, two membrane sheets separated by a feed water/brine spacer are backed by a water-carrying sheet of material specifically designed to collect the purified water and drain it toward one edge of the membranes. This composite structure is wound around a piece of duct which serves as a purified water collector. The mesh material spacer provides channels between two layers of membrane through which the incoming feed water flows across the surface of the membranes. This type of filtering element must be housed in a pressure vessel so that the feed introduced to the membrane surface is under sufficient pressure to drive the purified water through the membrane barrier. In a typical home water supply line the water pressure falls between 2.8 and 5.6 kilograms per square centimeters (40–80 psi). Under such conditions, the ratio of purified water produced to brine discarded to drain is 1 over 5. In other words, for each liter of purified water produced there is 5 liters of concentrate or brine discarded to the sewer drain. This means that 95 liters (approximately 25 gallons) of feed must flow across the membrane surface to produce 15.5 liters (approximately 4 gallons) of daily household consumption of purified water. Homeowners, in these times of ecological concerns and diminishing potable water resources, are becoming more and more reluctant to use a reverse osmosis filter equipment that wastes potentially five times the amount of water it purifies.

The prior art spiral-wound reverse osmosis filter elements tend to deteriorate quickly due to salt precipitation on the membrane surface which adheres to the mesh-like spacer material or becomes trapped therein. This results in both abrasion of the membrane surface and plugging of the element further reducing its efficiency or causing complete failure through perforation of the membrane. The narrow feed channel of prior art filter elements necessitate continuous feed flow over the membrane surface to prevent excessive salt buildup. The small volume of feed water held between the membrane layers could not sustain operation without discharge of brine for more than a few minutes.

SUMMARY OF THE INVENTION

The principal and secondary objects of the invention are: to provide a more efficient type of reverse osmosis membrane filter element that do not waste water; to provide a filter element that requires less line pressure or less feed flow than those of the prior art, to provide a filter element that can operate for long periods of time without feed flow or discharge of brine, to provide a simple and inexpensive construction of such improved filters.

These and other objects are achieved by eliminating the feed water/brine spacer material and leaving enough structured open channel where the feed/brine spacer was formerly located. The separation between coils of the coiled or folded layers of the membrane is provided by supporting ledges or perforated narrow spacer contacting only the lateral edges of the membrane.

BRIEF DESCRIPTION OF THE DRAWING

FIG. 1 is a perspective view of the preferred embodiment of the invention with cutouts exposing the internal structures;

FIG. 2 is a partial cross-sectional view taken along lines 2—2 of FIG. 1;

FIG. 3 is a partial front view of the inner surface of an end-wall;

FIG. 4 is a front view of the inner surface of the end-wall of an alternate filter configuration;

FIG. 5 is a perspective view of a central section of the filter element;

FIG. 6 is a perspective view of a membrane section with corrugated edge spacers; and FIG. 7 is a perspective view of a section of a corrugated membrane.

DESCRIPTION OF THE PREFERRED EMBODIMENT OF THE INVENTION

Referring now to the drawing, there is shown in FIG. 1 a spacerless feed channel membrane filter element 1 installed inside a water pipe 2. A spiral-wound reverse osmosis membrane bag 3 is sealed along its lateral edges 4, 5 and along its outer end 6. The membrane bag 3 is wound around a central purified water-collecting duct 7. The spiraled layers of the membrane bag are spaced apart by supporting ledges 9 molded into the inner surface of the end-walls 10, 11. Rows of bores 12 cut into the end-walls 10, 11 between the spiraled ledges 9 allow the feed water to circulate freely between the layers 8 of the membrane bag.

An alternate end-wall configuration 13 is illustrated in FIG. 4, where the membrane bag supporting ledges 14 follow an accordion-type multilayer configuration. The ledges 14 start from a nearby corner hole 15 designed to accommodate the purified water collecting duct, and progresses into a series of spaced-apart support layers interspersed with water circulation bores 16. It should be understood that other end-wall configurations may be devised to support the membrane bag 3 into a variety of spaced-apart layers geometries.

FIG. 5 illustrates a section of the central portion of the spiraled membrane bag 3 cross-sectioned about its median longitudinal line 17. The lips 18, 19 of the inner ends of the membrane bag are bonded to the outer wall of the collecting duct 7 on opposite sides of a series of water collecting bores 20. A sheet of purified water carrier material 21 is sandwiched between the two membrane sheets 22, 23 which form the filtering bag or bladder 3 in order to drain the purified water which passes through the membrane sheets 22, 23, toward the collecting bores 20 of the duct 7. The lateral and outer edges of the water carrier sheet 23 are bonded to the edges 4,5 and the outer end 6 of the two sheets 22, 23 of membrane material that forms the filtering bladder 3.

Experiments with the above disclosed embodiment of the invention have yielded the following results under the below-given conditions.

EXAMPLE

| | |
|---|---|
| Size of membrane bladder | 30 cm × 112 cm (12i × 45i) |
| Active membrane surface | .47 m$^2$ (5.0 Ft$^2$) |
| Filter element length | 35.5 cm (14i) |
| diameter | 10 cm (4i) |

EXAMPLE-continued

| | |
|---|---|
| Layer spacing | .57 cm (.23i) |
| Feed water pressure | 3.2 km/cm² (45 psi) |
| Time | 8 hours (without feed flow or brine discharge) |
| Yield | 4.26 liters (1.1 gallons) |

Thus, the above-described embodiment could be installed in the water-supply line of a home from which bathing, toilet flushing, washing and other external uses of the water can be drawn, while potable water is supplied by the filter element.

Such an embodiment of the invention having a much wider spacing between the layers of membrane than the prior art, can hold a larger volume of feed water. This allows continuous and effective generation of purified water for longer periods of time in the absence of any feed flow or discharge of brine.

In the alternate embodiment illustrated in FIG. 6, the interlayer spacing is provided by narrow spacing strips 24 bonded to the edges 4, 5 of the membrane bladder 3. The spacing strips 24 comprise a corrugated band 24 of nonsolvable material sandwiched between one of the edges 4, 5 of the membrane and a reinforcing tape 26.

In yet another embodiment of the invention illustrated in FIG. 7, the edges 4, 5 of the membrane bladder 3 are corrugated and held in that configuration by bonding to a supporting tape 27. In either one of the those two alternate embodiments, the membrane bladder 3 can be spirally wound around a collecting duct or folded in layers without need for supporting ledges 9, 14 projecting from the inner surface of the end-walls 10, 11.

The various embodiments described above can be easily modified to adjust the spacing between the layers of membrane and the feed water holding capacity of the element to meet specific feed water flow and purified water requirements.

It should be understood, that the above-described embodiments have other applications beyond water purification. One could, for example, be applied to the concentration of fruit juices, and other similar coarse feed stocks.

While the preferred embodiment of the invention has been described and alternate embodiments have been suggested, modifications can be made and other embodiments may be devised without departing from the spirit of the invention and the scope of the appended claims.

What is claimed is:

1. A reverse osmosis filtration device which comprises: means for providing an alternative to a feed/brine spacer material while providing sufficient structured open channel where said spacer material would otherwise have been located, including a flexible, elongated bladder made from two generally symmetrical sheets of reverse osmosis membrane peripherally bonded together;
   said bladder being wrapped into a plurality of spaced-apart layers;
   suspending means along two opposite edges of said bladder for spacing-apart said layers and for allowing unrestricted fluid flow from one of said opposite edges to the other between said layers; and
   means for draining the bladder.

2. The device of claim 1, wherein said suspending means comprise:
   a pair of symmetrical spacers, one spacer being a mirror image of the other, each in contact with one of said opposite edges; and
   said spacers having openings positioned to allow fluid flow between said layers.

3. The device of claim 2, wherein each of said spacers comprises:
   an end-wall generally perpendicular to said layers and abutting one of said opposite edges; and
   a patterned ledge projecting a short distance from said end end-wall between said layers.

4. The device of claim 3, wherein said patterned ledge defines a spiral.

5. The device of claim 4, wherein:
   said means for draining the bladder comprise a section of duct having at least one lateral aperture;
   said duct section centrally and perpendicularly spans said end-walls;
   a short end of the bladder has an opening, the rim of which is bonded to an outer surface of the duct section around said lateral aperture; and
   the bladder is spirally wrapped around the duct section in a plurality of spaced-apart coils laterally supported by said patterned ledges.

6. The device of claim 5 in combination with a conduit carrying a pressurized aqueous fluid wherein said device is shaped, dimensioned and positioned to allow said fluid to flow between said layers.

7. The device of claim 6, wherein said bladder comprises a sheet of water-carrier material interposed between said sheets of reverse osmosis membrane.

8. The device of claim 6, wherein said duct section extends outside said conduit.

9. The device of claim 8, wherein said conduit is a water supply line.

10. The Device of claim 8, wherein said aqueous fluid is a fruit juice.

11. The device of claim 2, wherein each of said spacers comprise a length of perforated, flexible, stripped-shaped structure.

12. The device of claim 11, wherein said strip-shaped structure comprises a strip of corrugated material and a tape of commensurate width bonded thereto.

* * * * *